Nov. 8, 1966  L. G. HAYES  3,283,452

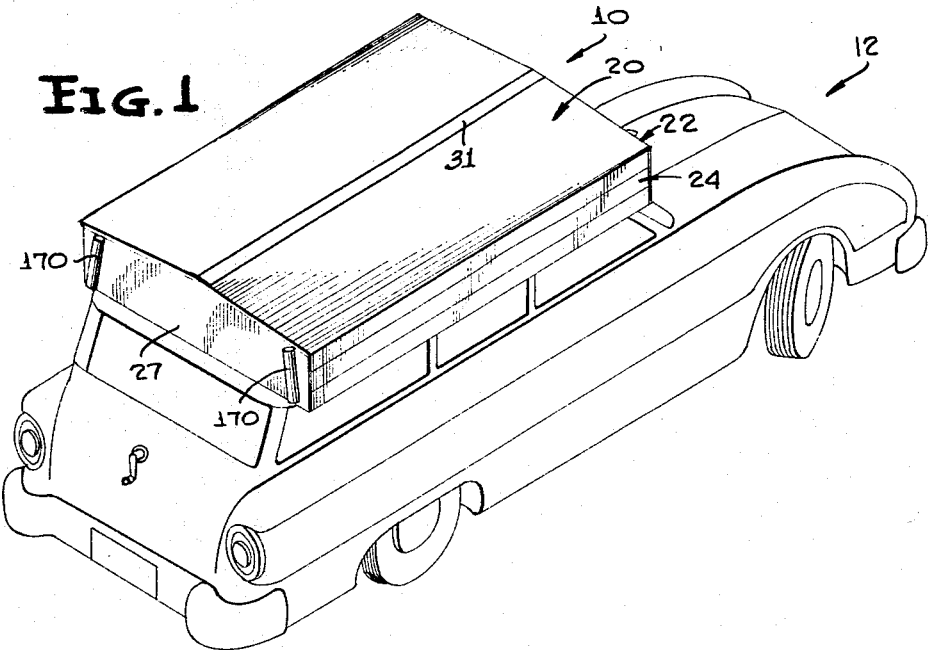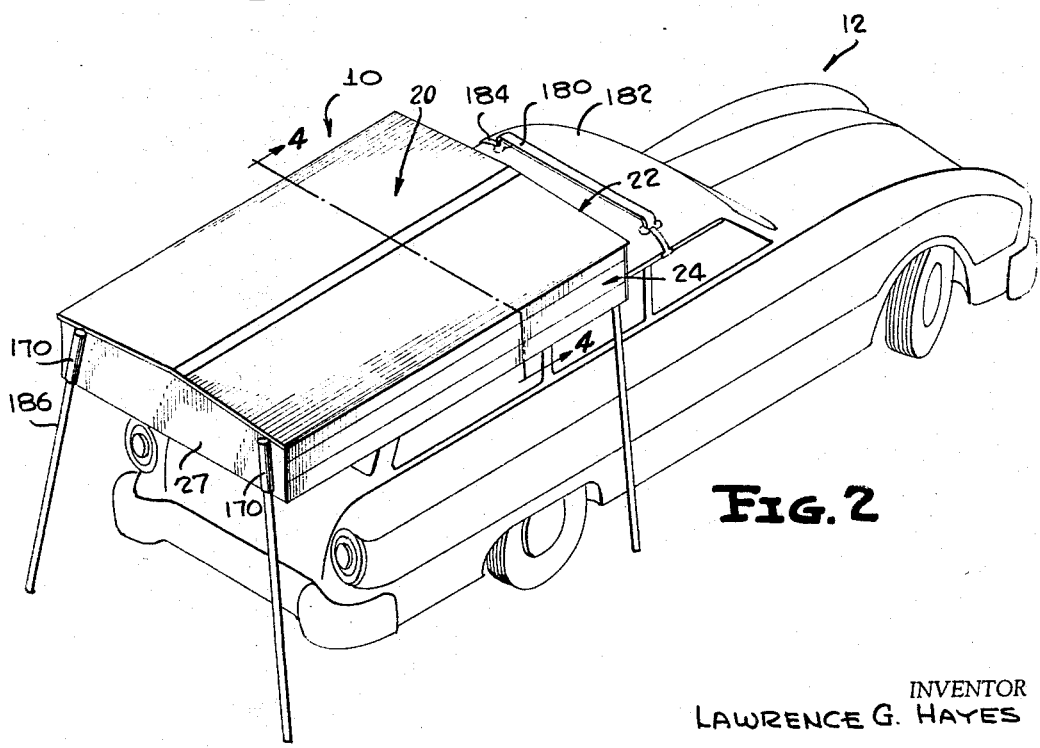

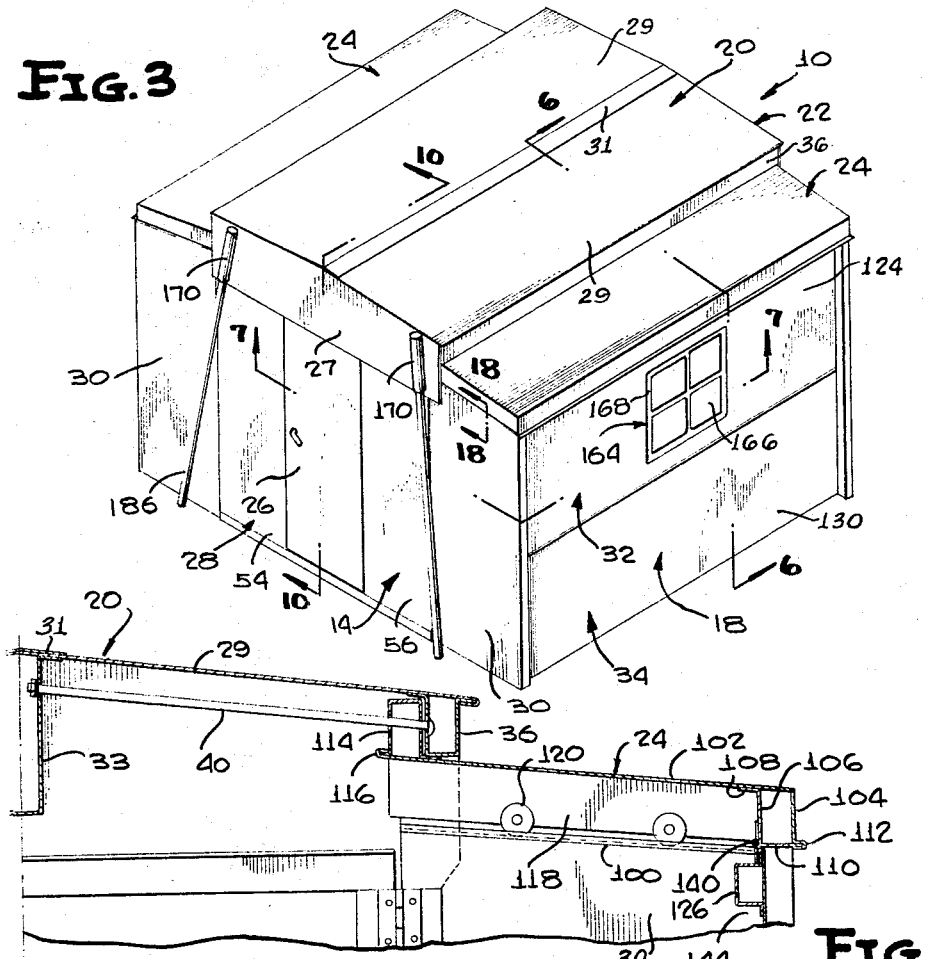
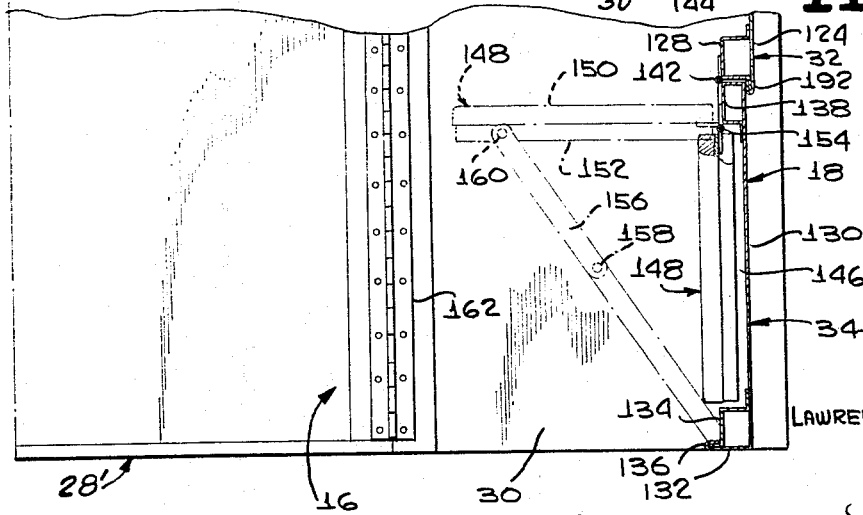

PORTABLE ENCLOSURE STRUCTURE

Filed Feb. 8, 1963  8 Sheets-Sheet 3

INVENTOR
LAWRENCE G. HAYES

BY *Shoemaker and Mattare*
ATTORNEYS

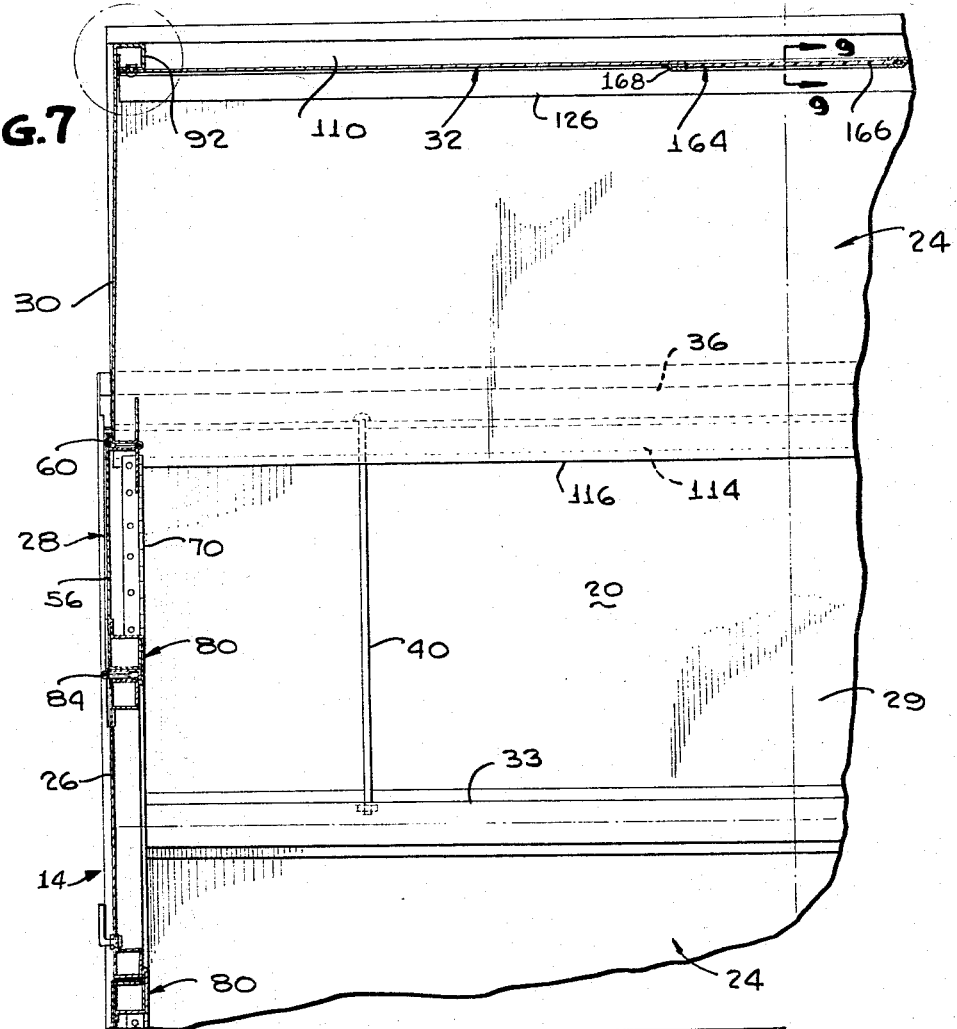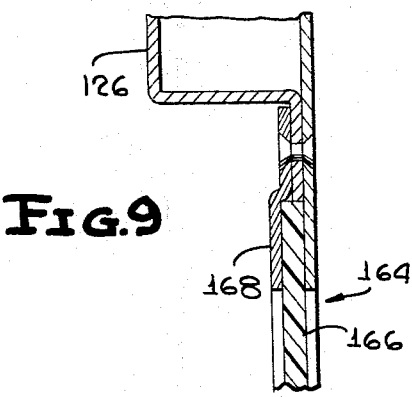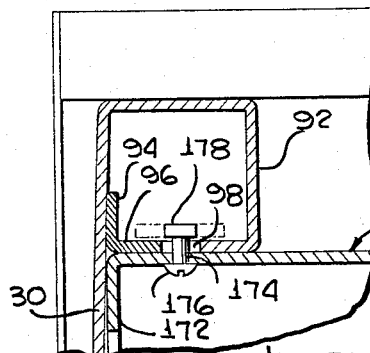

Nov. 8, 1966 L. G. HAYES 3,283,452
PORTABLE ENCLOSURE STRUCTURE
Filed Feb. 8, 1963 8 Sheets-Sheet 5
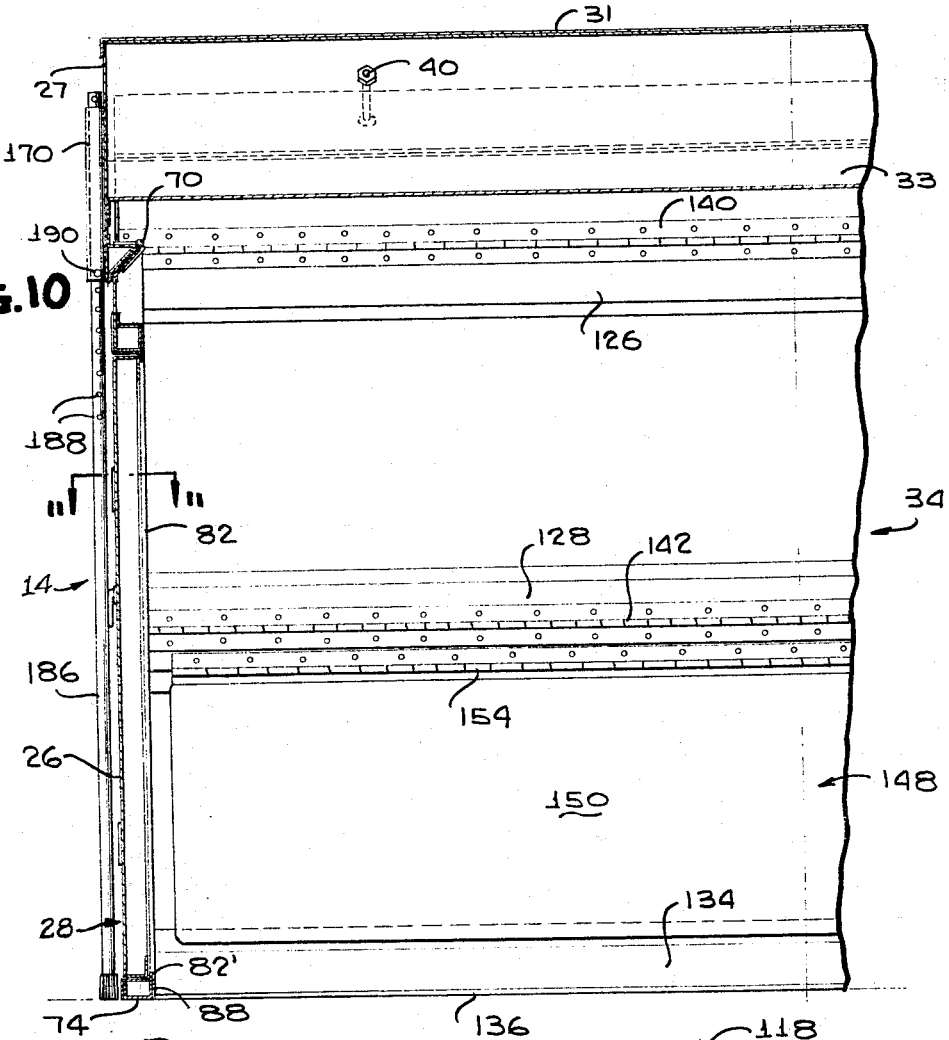
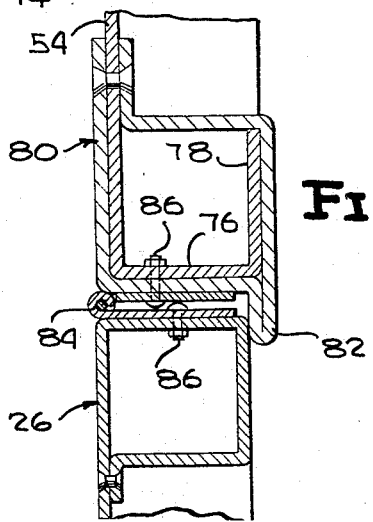
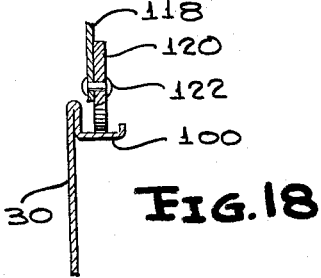
INVENTOR
LAWRENCE G. HAYES
BY Shoemaker and Mattare
ATTORNEYS Nov. 8, 1966     L. G. HAYES     3,283,452
PORTABLE ENCLOSURE STRUCTURE
Filed Feb. 8, 1963     8 Sheets-Sheet 6
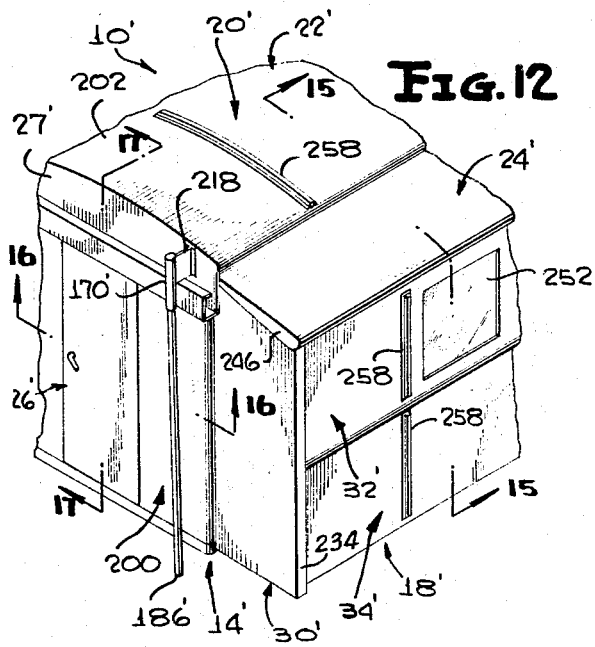
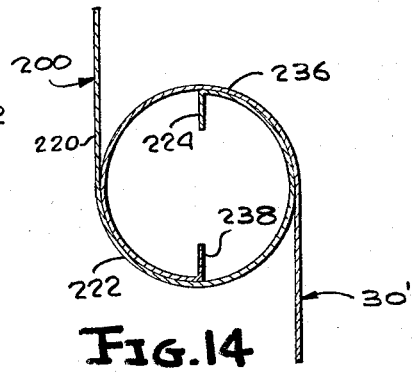
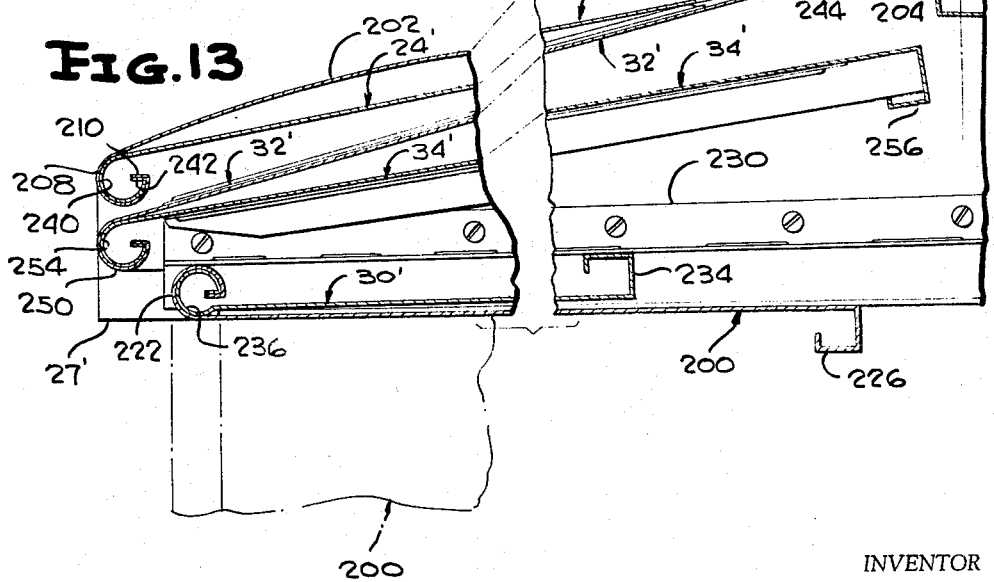
INVENTOR
LAWRENCE G. HAYES
BY *Shoemaker and Mattare*
ATTORNEYS

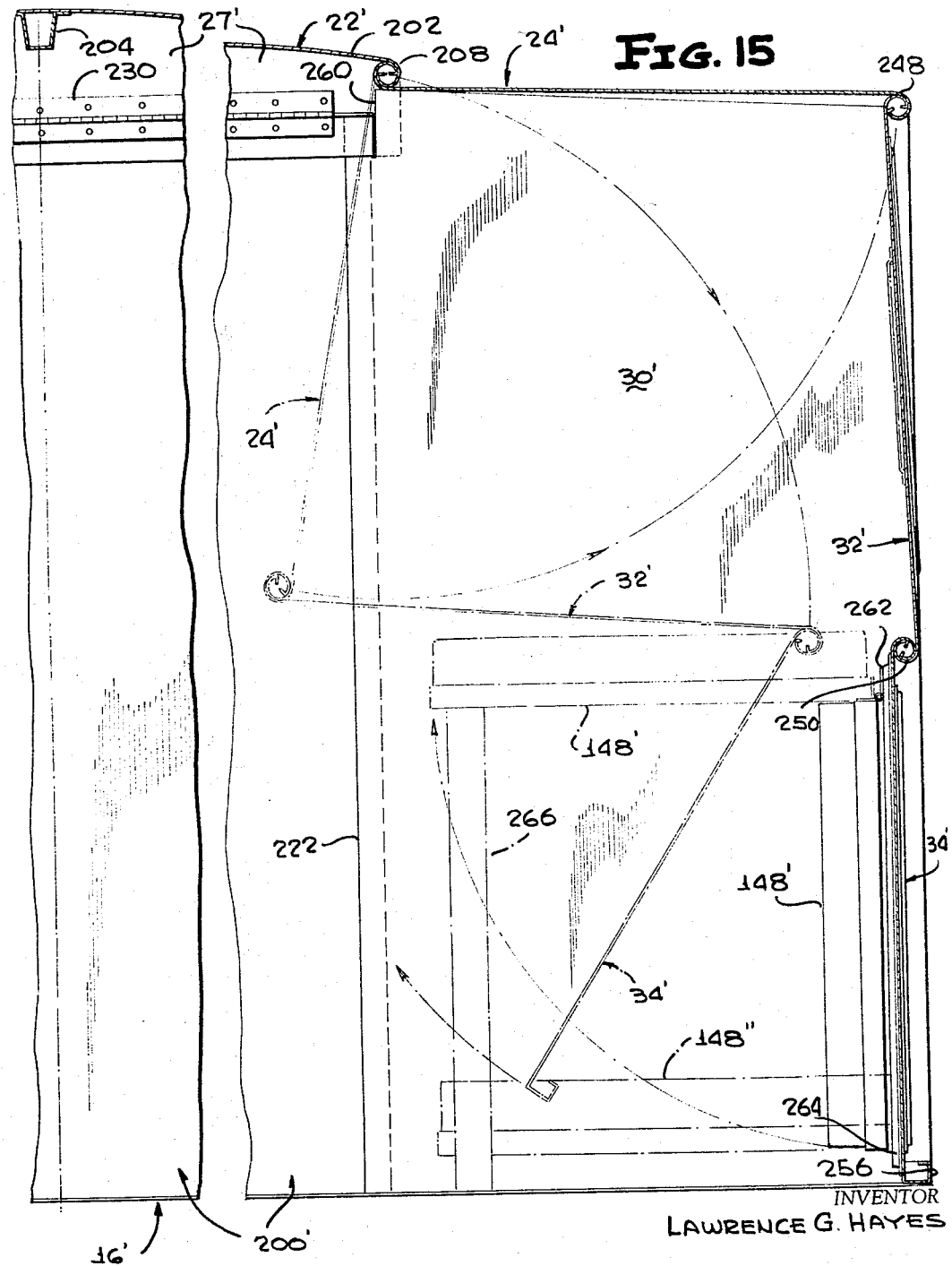

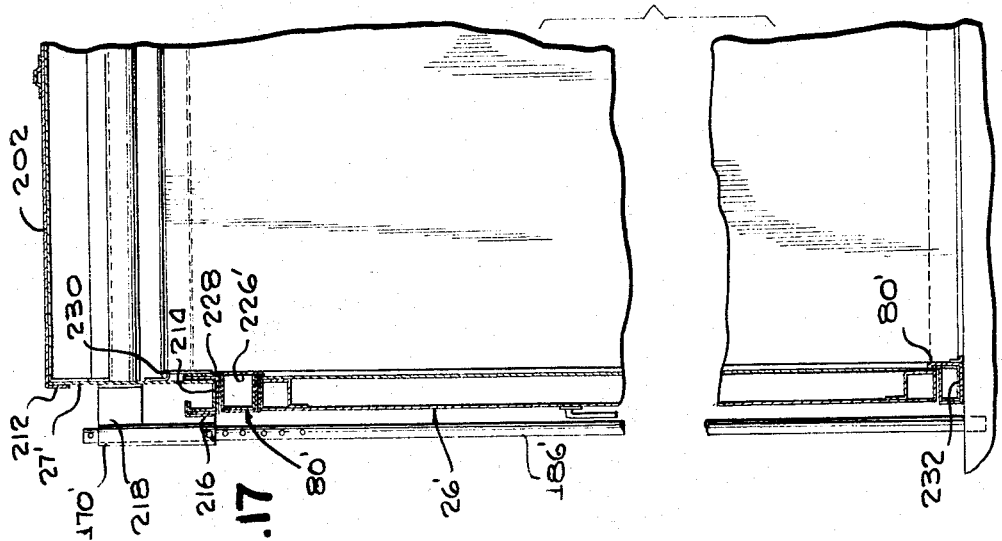
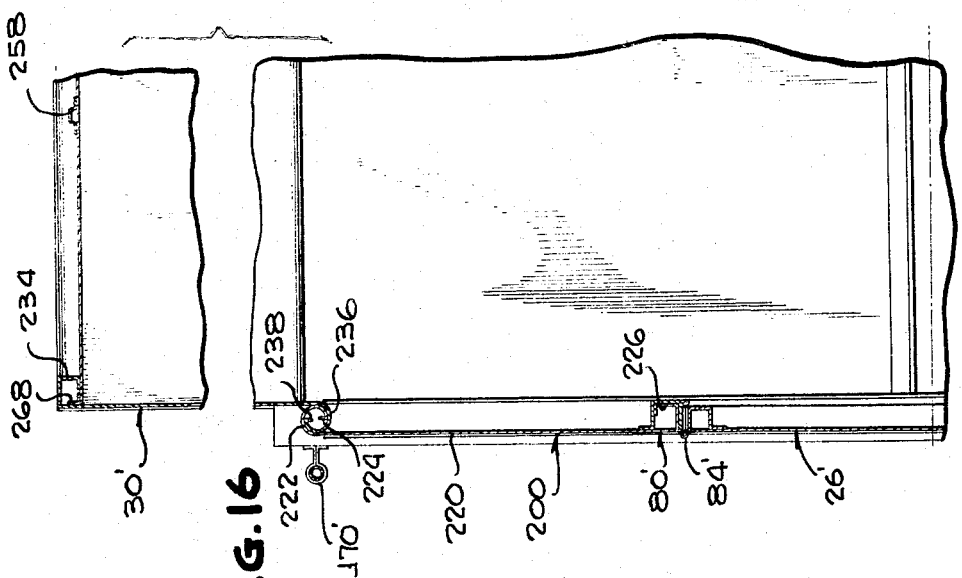

United States Patent Office 3,283,452
Patented Nov. 8, 1966

3,283,452
PORTABLE ENCLOSURE STRUCTURE
Lawrence G. Hayes, P.O. Box 72, 100 Main St.,
Wellsburg, N.Y.
Filed Feb. 8, 1963, Ser. No. 257,313
8 Claims. (Cl. 52—29)

This invention relates to enclosure structures, and more particularly to a portable and collapsible building structure which is adapted to be carried on top of automotive vehicles.

Briefly, this invention comprises an enclosure structure which includes a top section which has hingedly or slidably connected therewith foldable side and end panel structures. In the collapsed condition, the various sections of the enclosures are folded parallel and adjacent one another so as to form a rather compact box-like structure which may be readily carried atop conventional automotive vehicles. There are provided four sockets, one at each corner of the enclosure so that one may insert at each corner a support in the form of a tubular rod or the like which may have associated therewith a simple jack structure so that when each of the corners has a rod or support in its respective socket, the collapsed enclosure is then above the top of the vehicle and spaced therefrom so that the vehicle may then be driven away from beneath the enclosure and thereby leaving it supported by the four rods. The side and end panels may then be unfolded to a vertical position and bolted or secured together so as to form a substantially rectangular structure which is particularly adapted to be used as temporary quarters by travellers, campers, hunters, fishermen, etc.

Accordingly, it is a primary object of this invention to provide a building or enclosure structure which may be quickly folded to a very compact package so that it may be easily transported by conventional automotive vehicles, and may be quickly and easily unfolded and erected whereby it may be used as temporary living quarters, for storage of miscellaneous products or articles, or for any other desired purpose.

It is another object of the invention to provide an improved collapsible enclosure structure which is of light weight, economical to manufacture, durable and corrosion resistant in use, may be quickly erected or folded without requiring any special skill on the part of the operator, and is substantially watertight in use.

It is another object of this invention to provide a foldable building structure having recessed side panels with bunks secured thereto so that when the panels are folded, the bunks are automatically contained in the panel recesses for compact storage.

It is yet another object of this invention to provide a building structure which has panels secured together by novel hinge means which not only permit the panels to be easily folded for storage, but also function as strengthening means for the panels.

It is yet another object of the invention to provide a collapsible enclosure which is provided with novel means for supporting it above an automotive vehicle whereby the enclosure structure may be easily mounted on and removed from the vehicle.

It is another object of the invention to provide a building structure adapted to be carried by automotive vehicles which will perform all the functions of a trailer, yet will be substantially more economical since it requires less fuel for moving it, its initial cost is less, it is easier to handle while driving through traffic, and it requires no additional license plate.

It is still another object of the invention to provide a building structure that performs all the functions of a tent, yet is more comfortable than a tent because during sunny weather the temperature therein is at least 20° F. lower than a tent because the structure is made of reflective material such as sheet aluminum which reflects heat and sunlight.

It is still another object of the invention to provide a collapsible building structure that is not only suited to be carried atop automotive vehicles, but is also suitable for use as a play house, storage shed, or utility building.

The invention will be best understood from a consideration of the following detailed description taken in connection with the accompanying drawings, wherein:

FIG. 1 is a perspective view of the invention showing it in folded condition atop a conventional automotive vehicle.

FIG. 2 is a perspective view similar to FIG. 1 but showing how the structure is supported above an automotive vehicle so that the vehicle may be driven from beneath the structure.

FIG. 3 is a perspective view showing the invention in erected and expanded condition so that it is suitable for use.

FIG. 6 is an enlarged vertical cross sectional view taken substantially on the plane of line 6—6 of FIG. 3 with portions broken away.

FIG. 7 is an enlarged horizontal cross sectional view looking upwardly and taken substantially on the plane of line 7—7 of FIG. 3.

FIG. 8 is an enlarged view of the circled portion of FIG. 7.

FIG. 9 is an enlarged cross sectional view taken substantially on the plane of line 9—9 of FIG. 7.

FIG. 10 is an enlarged cross sectional view taken substantially on the plane of line 10—10 of FIG. 3.

FIG. 11 is an enlarged cross sectional view taken substantially on the plane of line 11—11 of FIG. 10.

FIG. 12 is a perspective view showing a portion of a modified form of the invention.

FIG. 13 is a view similar to FIG. 4 but showing the form of the invention of FIG. 12 in the folded condition.

FIG. 14 is an enlarged end view of one of the novel hinge means shown in FIG. 13.

FIG. 15 is an enlarged vertical cross sectional view taken substantially on the plane of line 15—15 of FIG. 12.

FIG. 16 is an enlarged horizontal cross sectional view taken substantially on the plane of line 16—16 of FIG. 12.

FIG. 17 is an enlarged vertical cross sectional view taken substantially on the plane of line 17—17 of FIG. 12.

FIG. 18 is an enlarged cross sectional view taken substantially on the plane of line 18—18 of FIG. 3.

Figure 4:
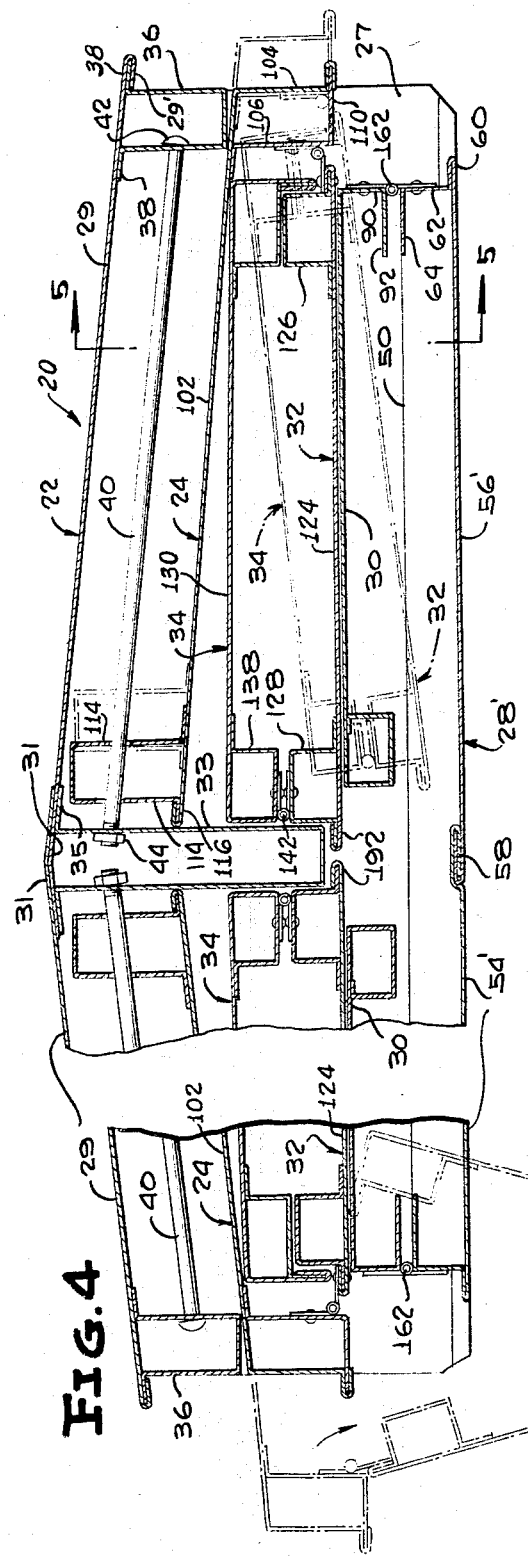
FIG. 4 is an enlarged vertical cross sectional view with portions broken away, taken substantially on the plane of line 4—4 of FIG. 2 looking toward the rear.

As illustrated in the drawings, and particularly in FIGS. 1, 2, and 3, the collapsible and portable enclosure structure 10 is adapted to be folded into a relatively thin rectangular package so that it may be carried on top of a conventional automotive vehicle 12, or it may be unfolded to form a generally box-shaped shelter or building structure as illustrated in FIG. 3.

When the enclosure is unfolded as shown in FIG. 3, it comprises a pair of vertical parallel end walls, one being designated as a whole, by numeral 14, while the opposite one is designated as a whole, in FIG. 6, by numeral 16, a pair of vertical parallel side walls one only being shown, and designated as a whole by numeral 18, and a roof 20. The roof 20 includes a generally rectangular main part 22 and a pair of substantially identical rectangular roof extension panels 24 which are laterally slidable into and out of the sides of the main part 22. The end walls 1⁄ and 16 are of identical size and construction except that the end wall 14 includes a rectangular opening having a door 26 hingedly mounted therein while the opposite end wall 16 is preferably imperforate. The end wall 14 and 16 respectively embody a central end panel 28 a central end panel 28' and a pair of extension panels 30 hingedly mounted on the outer edges of the end panels. Each of the side walls 18 includes an upper panel 32 and a lower panel 34 hingedly connected together along adjacent edges, and the upper edge of the panel 32 is hingedly connected to the outer side edge of one of the roof extension panels 24.

The enclosure 10 is composed substantially entirely of sheet metal, and preferably of sheet aluminum or aluminum alloy which has surfaces that reflect light and heat rays thereby causing the interior of the structure to be substantially cooler. By composing the enclosure 10 of aluminum its interior is up to 20° F. cooler than conventional enclosures composed of canvas.

The main part 22 of the roof includes a pair of vertically extending facade plates 27 at its opposite ends. Each facade plate has a pair of upper edges which slope downwardly and outwardly from the center thereof. A pair of roof panels 29 extend between and over the sloping edges of the facade plates. The inner edges of the roof panels 28 are deflected downwardly to form flanges 31 which overlap one another so as to form a weather proof seal at the center of the roof. A U-shaped channel 33 extends between the facade plates and has outwardly deflected upper flanges 35 secured by conventional means to the inner edge portions of one of the roof panels 29. Smaller U-shaped channels 36 extend between opposing faces of the facade plates and form depending side edge portions of the roof panels 29. These channels 36 have oppositely deflected upper flanges 38 secured to the outer edge portions of the panels 29. As shown in FIG. 4, the outer edge of each panel 29 is bent back upon itself as at 29', so as to enclose the outer flange 38 of the adjacent one of the channels 36. A pair of guide rods 40 extend through aligned apertures in the inner leg of each of the channels 36 and in the legs of the channel 33. Each guide rod 40 is provided with a head 42 abutting one leg of the channel 36 and a nut 44 threaded on the inner end of each rod abuts the inner surface of one of the legs of the channel 33. The guide rods 40 are parallel to the facade plates 27 and the roof panels 29.

Figure 5:
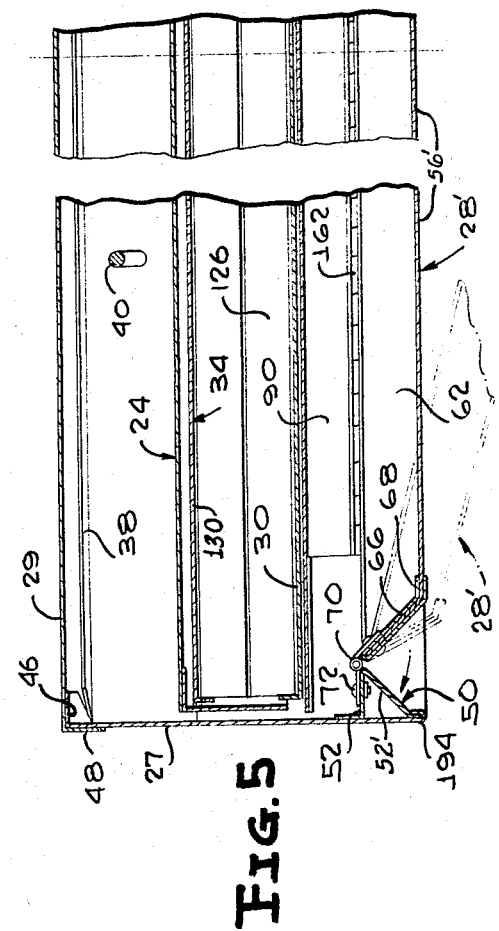
FIG. 5 is a vertical cross sectional view with portions broken away taken substantially on the plane of line 5—5 of FIG. 4.

As shown in FIG. 5, the upper edges of the facade plates 27 are deflected inwardly to provide flanges 46 adjacent to the roof panels 29 and the ends of the roof panels are deflected downwardly to form flanges 48 which overlap the facade plates. The flanges 46 and 48 as well as the other flanges comprising the enclosure 10 are secured to adjacent sheet metal members by conventional means such as screws, bolts, spot welds, etc.

The lowermost edge of each facade plate 27 has secured thereto a horizontally extending support 50 of substantially V-shaped cross section as shown in FIGS. 4 and 5. Each support 50 includes a horizontal upper leg 52 integrally connected to a downwardly sloping leg 52'. Each of the legs is provided with an integral coplanar flange secured to the inner surface of a facade plate 27. The lowermost edge of each facade plate is bent back upon itself so as to enclose the lowermost flange of the adjacent one of the supports 50.

The end panel 28 of the front end wall 14, comprises two sheets of metal 54 and 56 on opposite sides of the door 26. The rear end wall designated as a whole by the numeral 16 and which includes the said end panel 28' corresponds to the front end panel 28 except that a door and frame are omitted. Therefore, as shown in FIG. 4, the rear end panel 28' comprises two sheets of metal 54' and 56' whose adjacent edges are secured together by a folded lap joint 58. When the enclosure 10 is unfolded as shown in FIG. 3, the end panels 28 and 28' extend vertically and parallel to one another. Each sheet of each of the end panels 28 and 28' has a side edge folded back upon itself 180° to form a double thickness flange 60 as shown in FIG. 4. An edge portion of each panel is then bent 90° inwardly to form an edge flange 62, and is then again bent inwardly 90° to form a lip 64. As shown in FIGS. 5 and 10, the tops of the sheets are bent inwardly at a 45° angle to form a sloping flange 66 which is reinforced by a sheet of metal 68 bent completely around the flange 66 and secured thereto. The end panels 28 and 28' are secured to the supports 50 by a pair of piano hinges 70 which extend completely across the tops of the end panels and each hinge has one leaf secured to the upper leg 52 of one of the supports 50 and another leaf secured to the sloping flange 66. Conventional nut and bolts 72 may be used for securing the piano hinges in place. As shown in FIG. 10, the sheets comprising each end panel are reinforced along their bottom edges and connected together by an elongated U-shaped channel member 74 which overlaps the bottom edge of each end wall and extends entirely thereacross.

A rectangular opening is formed between the sheets 54 and 56 of the end panel 28 for the door 26. The edges of the sheets defining this opening are bent inwardly as shown in FIG. 11 to form a flange 76 and the outer edge of the flange 76 is bent upwardly to form a lip 78. The flange and lip edge portions of the sheets defining the opening, are enclosed by a door frame 80 composed of sheets of metal bent into a generally box-like configuration but also including an inwardly projecting lip 82 which functions as a door stop.

As shown in FIGS. 3 and 11, the door 26 may be composed of a sheet of rectangular metal reinforced by having its edges bent into a rectangular configuration. The door 26 is pivotally connected along one edge thereof to one edge of the door frame 80 by means of a piano hinge 84 secured to the frame and door by nut and bolts 86. As shown in FIG. 10, the bottom of the door frame includes a U-shaped channel member 88 telescopically enclosed the central portion of the channel member 74 and having an upper lip 82' in alignment with the lip 82.

As shown in FIGS. 3, 4, and 7, the four extension panels 30 are all of identical design and comprise a generally rectangular sheet of metal having an inner edge bent inwardly 90° to form a flange 90. The free edge of each flange 90 has a portion bent outwardly parallel ot the panel to form a lip 92. As shown in FIGS. 7 and 8, the outer edge portion of each panel 30 is bent into a generally box-like configuration to form a reinforcing post 92. Each post 92 includes a terminal flange 94 secured to the rear or inner face of its respective panel and to a wall 96 having a plurality of spaced rectangular slots 98 formed therein for a purpose described below. The upper edge of each panel 30 is sloping so as to be parallel to an adjacent roof panel 29.

As shown in FIG. 18, the upper edge of each extension panel 30 may be bent downwardly 180°, inwardly 90° and upwardly 90° so as to form a generally U-shaped track 100 for purposes explained below.

The extension panels 30 are higher than the end panels 28 and 28' so as to extend upwardly to the roof extension panels 24 when the enclosure is unfolded as shown in FIG. 3.

As shown in FIGS. 4 and 6, each of the roof extension panels 24 comprises a sheet of metal 102 having its outer edge bent downwardly to form a side flange 104. A Z-shaped member 106 extends parallel to the flange 104 and is secured to sheet 102 by its upper leg 108. The bottom edge of the flange 104 is bent around and secured to the bottom leg 110 of the Z-shaped member as shown at 112. An inverted U-shaped channel member 114 is secured along the upper inner edge portion of sheet 102 of roof panel 24 by means of coplanar flanges integral with the channel member. The inner edge of the sheet 102 is bent around and secured to one of these flanges as shown at 116. The ends of the sheet 102 are bent downwardly to form end flanges 118. A pair of aligned passages are formed through each of the channel members 114 so as to slidably receive a pair of the rods 40.

A plurality of wheels or rollers 120 are journalled on each end flange 118 by means of rivets 122. The wheels 120 normally are supported upon the track 100.

Each side wall 18 comprises an upper panel 32 and a lower panel 34. Upper panel 32 comprises a sheet of metal 124 having secured to its upper and lower edges U-shaped channel members 126 and 128. Each of the channel members terminates in coplanar flanges which abut against the inner surface of sheet 124. The upper and lower edges of the sheet 124 are bent around the upper and lower flanges of the channel members 126 and 128 as shown in FIG. 6.

Each lower panel 34 comprises a sheet of metal 130 whose lower edge is bent inwardly 90° to form a flange 132. An angle member 134 is provided with flanges which are secured to the sheet 130 and the flange 132. The free edge of flange 132 is bent around one of the flanges on angle member 134 as shown at 136. The upper edge of each panel 34 is bent into a generaly box-like configuration to form a rectangular bead 138.

The upper edge of each upper panel 32 is pivotally secured to the outer edge of one of the roof extension panels 24 by means of a horizontally extending hinge 140. Hinge 140 has one leaf secured to Z-shaped member 106 and another leaf secured to the upper flange of channel member 126. The adjacent edges of panels 32 and 34 are secured together by a horizontally extending hinge 142. Hinge 142 has one leaf secured to channel member 128 and another leaf secured to rectangular bead 138.

A generally rectangular space 144 is defined between the channel members 126 and 128, and another generally rectangular space 146 is defined between the bead 138 and the angle member 134. A bunk 148 comprising a spring assembly 152 and a mattress 150 may be pivotally connected to an inner surface of the rectangular bead 138 by means of a hinge 154. Bunk 148 is normally supported in a horizontal position by a suitable brace 156 which may comprise two rigid members pivoted together at 158 and pivotally connected to an outer edge of the bunk springs by a pivot pin 160. The lowermost end of brace 156 is shaped to fit within an inner corner of angle member 134 as shown in FIG. 6.

As shown in FIGS. 4 and 6, each extension panel 30 is pivotally connected to one of the end panels 28 or 28' by means of an elongated piano hinge 162 which has one leaf secured to the edge flange 62 and another leaf secured to a flange 90.

As shown in FIGS. 3, 7, and 9, each of the upper panels 32 is preferably provided with an opening containing a window 164 comprising a plurality of plastic transparent panes 166 secured in position by a suitable frame 168.

Each of the facade plates 27 has secured to its ends a pair of tubular sockets 170 which extend downwardly in diverging relationship.

The end edges of the panels 32 and 34 are folded inwardly 90° to form strengthening flanges one of which is shown in FIG. 8, at 172. The edge portions of the panels 32 and 34 are provided with a plurality of aligned bores which rotatably receive cylindrical studs 174 having a conventional screw head 176 integrally formed on one end thereof and an elongated rectangular or oval locking plate 178 integrally formed on the other end thereof. Each of the plates 178 is adapted to extend through the rectangular openings 98 in post 92 whereby the stud 174 may be rotated 90° so as to move the plate 178 to the dotted line position shown in FIG. 8 so as to secure panels 32 and 34 to post 92 and extension panels 30.

For transport and storage, the enclosure 10 is normally folded to the relatively flat rectangular package as shown in FIGS. 1, 2, 4, and 5. When the enclosure is so folded, it may be carried upon the roof of a conventional automotive vehicle 12 by means of conventional roof bars 180 which are temporarily secured to the roof 182 of the vehicle by means of straps 184 which are provided with hooks on their free ends which hook over the side edges of the roof 182. The enclosure 10 may be temporarily secured to the bars 184 by conventional means such as straps, screws, hooks, etc.

To remove the enclosure 10 from the top of the vehicle 12, the enclosure is disconnected from the bars 180 and a post 186 is inserted through each of the sockets 170. Each post 186 is provided with a plurality of axially spaced radial bores 188 and a bore is provided through the bottom end of each of the sockets. Since the enclosure 10 is of light weight, each corner thereof may be successively lifted a few inches above the bars 180 and then a pin 190 is inserted through the bore in each socket and an aligned bore 188 in a post 186 as shown in FIG. 10. After the enclosure is supported above the bars 180, the vehicle may be driven from beneath the enclosure as illustrated in FIG. 2. Of course, if desired, each of the posts 186 may be provided with a built-in jack whereby the enclosure 10 may be jacked above the bars 180.

After the folded enclosure 10 is supported on the posts 186 the end panels 28 and 28' along with the extension panels 30 secured thereto, are pivoted downwardly 90° to a vertical position about hinges 70. The extension panels 30 are then pivoted outwardly 180° to a position where they are coplanar with the end panels 28 and 28' as shown in FIG. 3. FIG. 5 illustrates in dotted lines how the end panels 28 and 28' are unfolded to a vertical position. It is to be noted that when the panels are in vertical position, the upper sloping edges thereof abut the sloping leg 50 of the support 52 so as to limit pivotal movement of the end panels. It is also to be noted that by having the axes of the hinges 70 offset inwardly from the facade plates 27, the upper end portions of the extension panels 30 which normally extend above the end panels 28 and 28' may be effectively contained between the facade plates 27 without contacting same. Note in FIG. 5 how the upper ends of the extension panels 30 project outwardly beyond hinge 70 and above support 52. As shown in FIG. 7, when the extension panels 30 are pivoted outwardly coplanar with the end panels, the adjacent edges of the end and extension panels abut so as to limit outward pivotal movement of the extension panels.

After the end walls 14 and 16 have been unfolded, the roof extension panels 24 are pulled outwardly from between the facade plates 27 as shown in FIG. 3. As the roof extension panels 24 move outwardly the rollers 120 ride upon the tracks 100 thereby supporting the roof extension panels and permitting them to be withdrawn or extended in a substantially frictionless manner.

After the roof extension panels 24 are fully extended, the upper and lower panels 32 and 34 are unfolded as illustrated in dotted lines in FIG. 4 until the panels are vertical and coplanar. When the upper and lower panels 32 and 34 are completely unfolded to a vertical position, the side edges thereof abut the inner faces of the posts 92 as shown in FIG. 8. Then the locking plates 178 are inserted through the slots 98 and rotated 90° to the dotted line position as shown in FIG. 8 so as to securely lock the panels 32 and 34 to the extension panels 30.

To disassemble or fold the erected enclosure shown in FIG. 3, the above process is reversed. First, the locking plates 178 are rotated and withdrawn from the slots 98 and then the upper and lower panels 32 and 34 are folded to a position adjacent to and parallel to the roof extension panels 24. The roof extension panels 24 are then pushed inwardly between the facade plates 27. Then the extension panels 30 are rotated inwardly 180° parallel to the end panels 28 and 28' after which the end panels are pivoted upwardly 90° to a position shown in solid lines in FIG. 4. The folded panels may then be secured in folded position by a strap, bolts, or other conventional means, and then the vehicle 12 may be driven under the folded enclosure whereupon the enclosure may be lowered onto and secured to the bars 180.

It is to be noted that when the enclosure is unfolded and erected, the double thickness flange 60 on the end panels overlap adjacent edges of the extension panels 30, and the flanges 192 along the bottom edges of the upper panels 32 overlap the lower panels 34 to provide effective weatherproof seals. Also, as shown in FIGS. 5 and 10, the lower edges or flanges 194 of the facade plates overlap the end panels to provide a weatherproof seal.

When the enclosure 10 is folded, the bunk 148 is pivoted to the solid line position shown in FIG. 6, whereupon when the enclosure is completely folded, the bunk is contained within the spaces 144 and 146.

FIGS. 12 through 17 show a modified form 10' of an enclosure which is substantially of the same design as the enclosure 10 except the various panels are connected together in a different manner thereby necessitating that the enclosure be folded and unfolded by a different technique.

As shown in FIG. 12, the enclosure 10' comprises end walls 14' and 16', side walls 18' and a roof 20'. The roof includes a main part 22' having roof extension panels 24' pivotally connected to opposite edges thereof. The end wall 14' includes an end panel 200 having extension panels 30' pivotally connected to opposite edges thereof and a rectangular opening in the center thereof containing a pivoted door 26'.

The roof main part 22' comprises a sheet of metal 202 formed into an arcuate shape and reinforced along its center by longitudinally extending U-shaped channel 204 which is secured to the undersurface of the sheet 202 by means of a pair of outwardly extending coplanar flanges 206. As shown in FIG. 13, the side edges of the sheet 202 are deformed downwardly and inwardly into a substantially cylindrical shape to form a reinforcing bead and hinge member 208. The bead 208 extends through an arc of substantially 260° whereby the free edge of the sheet 202 terminates in a flange 210 extending radially of the bead. Each end of sheet 202 extends over and is secured to a facade plate 27'. The end portions of the sheet 202 are bent downwardly in overlapping relationship to the facade plates so as to form a flange 212. The facade plates 27' are of generally rectangular shape except for their upper edges which are arcuate and concentric with the curvature of sheet 202. The bottom edge of each facade plate is bent outwardly, upwardly, and inwardly as shown in FIG. 17 to form a generally J-shaped flange of bead 214. The bottom edge portion of each facade plate and its J-shaped flange 214 are telescopically received within and connected to a hollow reinforcing member 216 of generally rectangular shape in cross section. A pair of tubuler sockets 170' are connected to opposite ends of each facade plate by means of struts 218.

As shown in FIGS. 12 and 16, the end panels 200 comprise a sheet of metal 220 having its outer edge formed into a semi-circular bead 222 terminating along one edge in a radial stop flange 224. The inner edge of each sheet 220 is deformed into an angular flange 226 which defines an opening for the door 26'. The flanges 226 are reinforced and enclosed in a door frame 80' similar to that shown in FIG. 11. As shown in FIG. 17 the upper edge portion of each panel 200 is defined by a generally box-like bead 226' which is enclosed by a portion of the door frame 80'. A portion of each end panel 200 extends upwardly behind the reinforcing member 216 to form a flange 228. Flange 228 of each panel is pivotally connected to a lower edge portion of a facade plate 27' by means of a horizontal hinge 230. The bottom edge of each sheet 220 is bent outwardly and upwardly to form an angular flange 232 which is enclosed in and secured to the bottom portion of the door frame 80'. One side edge of the door 26' is pivotally connected to one side of the door frame 80' by means of an elongated piano hinge 84' in a manner similar to that shown in FIG. 11. The door 26' is of the same general design and construction as the door 26 described above.

Each of the extension panels 30' comprises a sheet of metal having its outer edge bent into a generally rectangular configuration so as to form a J-shaped flange 234 and having an inner edge deformed into a part cylindrical bead 236 which extends through an arc of approximately 270° and terminates in a radial flange 238. The inner-nesting part cylindrical beads 222 and 236 form a hinge means that permits the panel 30' to be pivoted 180° (counter clockwise) as viewed in FIG. 16 (from a position extending outwardly parallel to the panel 200 to a position extending inwardly parallel to the panel 200).

Each of the roof extension panels 24' comprises a flat sheet of metal having an inner edge (when in the unfolded or extended position) formed with a part cylindrical bead 240 rotatably inter-nested in the bead 208 and terminating in a radial flange 242. The bead 240 projects from the upper side of panel 24', and a part cylindrical bead 244 is formed on the inner edge of the panel so as to project downwardly on the opposite side of the panel as the bead 240. Bead 244 terminates in a radial flange similar to the flange 242. Opposite ends of each roof extension panel 24' are provided with tapered flanges 246 on each end thereof as shown in FIG. 12 which project downwardly adjacent the tops of the extension flanges 30'.

Each upper panel 32' includes a flat sheet of metal whose upper edge is formed into a part circular bead 248 which rotatably and telescopically receives the bead 244 to form a hinge means for rotatably connecting panel 32' with panel 24'. In the erected or folded position, bead 248 projects outwardly to form a weatherproof and waterproof seal. The lower edge of each panel 32' is formed with a part cylindrical bead 250 which projects inwardly.

Each panel 32' is also preferably provided with a rectangular opening closed by a plastic window pane 252 which is secured within the opening in a conventional manner.

Each lower panel 34' is formed of a flat sheet of metal having an outwardly projecting part cylindrical bead 254 formed on its upper edge which is rotatably and telescopically received within the bead 250. The bottom edge of each lower panel 34' is bent into a generally J-shaped flange 256.

The door 26' and door frame 80' have been omitted from FIG. 13. FIGS. 12, 16, and 17 illustrate how a rectangular door opening may be formed in one of the end panels 200 and how this opening may be normally closed by a door hinged therein. The other end panel 200 which is not shown in FIG. 12 may be made identical to the end panel 200 shown in FIG. 12, or alternatively it may be made imperforate or provided with a conventional window.

FIG. 14 is an enlarged view of a hinge 222, 236 connecting one of the end panels 20 to one of the extension panels 30'. This hinge is of the same general design and construction of the cylindrical hinges which pivotally connect the various panels of the enclosure 10' and comprises two part cylindrical beads 222 and 236 integrally formed along side edges of the panels which extend preferably through an arc of 270° and terminate in radially extending flanges 224 and 238. Each of the part cylindrical beads comprising each hinge are preferably 1½ inches in diameter. However, since the beads are formed of resilient sheet metal, when they are inter-nested to form a hinge, the inner bead compresses slightly and the outer bead expands slightly to form a snug weathertight fit therebetween. The beads not only serve as parts of a hinge, but also function to strength and rigidify the panels to which they are attached.

The central portion of the roof 22′, the upper panels 32′ and the lower panels 34′ may be reinforced by stiffening channels 258 welded to their exterior surfaces.

As shown in FIG. 15, each of the extension panels 30′ is preferably provided with an upper extension 260 which extends upwardly to a roof extension panel 24′. The extensions 260 may be pivotally connected to the upper edges of the extension panels 30′, or they may be integrally connected thereto as shown in FIG. 15. If the extensions 260 are integrally connected, the hinges 230 may be offset inwardly of the facade plates 27′ so as to permit the extension panels to be folded as shown in FIG. 13.

A bunk 148′ may be pivotally connected to the upper edge of each of the lower panels 34′ by means of a piano hinge 262. Preferably each of the lower panels 34′ is reinforced by a plurality of vertically extending channels 264 and hinge 262 is secured to the upper ends of these channels as shown in FIG. 15. The bunk 148′ is similar in construction to the bunk 148. However, when it is unfolded to the horizontal position as indicated in dotted lines in FIG. 15, it may be supported by vertical removable legs 266.

FIG. 13 illustrates the enclosure 10′ in a folded condition wherein all the roof and wall panels are substantially parallel to one another and closely adjacent one another. When the enclosure 10′ is so folded, it may be carried on the roof of an automotive vehicle in the same manner as the enclosure 10 as illustrated in FIGS. 1 and 2. To unfold and erect the enclosure 10′, it is first removed from the vehicle and supported on posts 186′ which are inserted in and secured to the sockets 170′ as illustrated in FIG. 12. Each of the end panels 200 and 200′ is then pivoted downwardly 90° above its hinge 230 to a vertical position as illustrated in FIG. 17 and as illustrated in dotted lines in FIG. 13. Each of the extension panels 30′ is then pivoted outwardly 180° as illustrated in FIG. 16 so that they project outwardly parallel to the end panels. Each of the roof extension panels 24′ is then pivoted outwardly 180° as illustrated in FIG. 15. After the roof panels 24′ are extended outwardly in a generally horizontal position, each of the upper panels 32′ is then rotated upwardly, outwardly and downwardly approximately 270° to a vertical position as illustrated in solid lines in FIG. 15, and then each of the lower panels 34′ is rotated inwardly and downwardly about its respective hinge approximately 180° to a vertical position as illustrated in solid lines in FIG. 15. After the upper and lower panels are moved to a substantially vertical position, the outer edge portions of each of the extension panels 30′ are then moved inwardly slightly as shown in FIG. 16 so that the flanges 234 thereof overlap the end portions of the panels 32′ and 34′. Preferably, the panels 32′ and 34′ have angle members 268 secured to their ends which project into the flanges 234. The ends of the panels 32′ and 34′ may then be secured to the flanges 234 of the extension panels 30′ by means of conventional nuts and bolts or by locking means similar to that shown in FIG. 8.

To dis-assemble and refold the enclosure 10′, the flanges 234 are disconnected from the upper and lower panels 32′ and 34′, and then the various panels are refolded in the reverse manner as explained above.

As illustrated in FIG. 15, a second bunk 148″ may be detachably connected to each of the panels 34′ and the legs 266.

Although each of the enclosures 10 or 10′ may be made of any desired size, they are preferably 12 feet long by 12 feet wide and 6½ feet high. They are preferably composed of .032″ aluminum alloy and weigh approximately 200 lbs. When the enclosures are folded, they are approximately 6½ feet wide.

Preferably, all the sheet metal parts comprising the enclosures are spot welded together, although they may obviously be connected by other conventional means.

Inasmuch as various changes may be made in the form, location and relative arrangement of the several parts without departing from the essential characteristics of the invention, it will be understood that the invention is not to be limited except by the scope of the appended claims.

I claim:

1. A foldable enclosure comprising a roof including a main part, depending side edge portions and opposite end edge depending portions, a pair of roof extension panels, means carried by said roof main part movably supporting the said roof extension panels between said end depending portions for movement outwardly away from one another to a position wherein the roof extension panels extend laterally outwardly of said side edge portions of said roof main part, side wall portions each having an upper horizontal edge, means pivotally connecting the upper edges of the side wall portions to the outer side portions of said roof extension panels, end wall portions each having the upper edge thereof pivotally interconencted to and along an edge of one of said depending end edge portions of said roof main part, each of said end wall portions including opposite side edges extending downwardly from said upper edge thereof, and a pair of end wall extension panels pivotally interconnected with opposite side edges of each of said end wall portions whereby the enclosure is adapted to be folded into a position wherein the side wall portions and the end wall portions as well as the end wall extension panels are disposed in superposed relation substantially parallel with one another and with said roof main portion.

2. A foldable enclosure according to claim 1, with a guide and support element extending across the inner side of the top portion of each end wall extension panel, and means carried by each roof extension panel adjacent to each end thereof for engagement with and movement along the adjacent guide and support element upon outward and inward movement of the roof extension panel.

3. A foldable enclosure according to claim 1 wherein each of said side wall portions comprises an upper and a lower panel, said upper and lower panels being pivotally connected to one another for relative turning along axes substantially parallel with the axis of the pivital interconnection between the said side wall portion and the adjacent roof extension panel.

4. A foldable enclosure according to claim 3, wherein each of said side wall portions has a bunk movably connected therewith, each of said upper and lower panels having a recess therein adapted to receive said bunk when said upper and lower panels are pivoted so as to be disposed substantially parallel and adjacent to one another.

5. A foldable enclosure according to claim 1 wherein said depending end edge portions of the roof main part each comprises a facade plate, a support means secured upon the inner side of each facade plate adjacent to the lower edge thereof and having an inner edge portion projecting inwardly therefrom, and said pivotal interconnections of said end wall portions to said depending end edge portions of the roof main part includes a hinge means therebetween.

6. A foldable enclosure according to claim 5, wherein said support means and the upper portions of the adjacent end wall portions are provided with complementary surfaces adapted to abut one against the other and being disposed at an inclination to said adjacent facade plates when the end portions are in operative position extending substantially normal to said roof main part whereby to limit pivotal movement of said end wall portions in one direction relative to the said roof main part.

7. A foldable enclosure according to claim 5, wherein the said means pivotally connecting the upper edges of the side wall portions of the outer side edge portions of said roof exetnsion panels are disposed in a plane lying above said hinge means, each side wall portion comprising an upper panel having a bottom edge and a lower panel having a top edge opposing said bottom edge, hinge means pivotally coupling together said opposing top and bottom edges of the panels, said upper and lower panels of each side wall portion each having a height less than one half the width of said roof main part.

8. A foldable enclosure comprising a roof including a substantially rectangular main part having opposite depending side edge portions and opposite end edges, a facade plate secured to each of said opposite end edges of said roof main part, a pair of roof extension panels disposed between said facade plates for separatory movement outwardly into a position extending laterally of said side edge portions of the roof main part, guide means carried by said roof main part in operative connection with said roof extension panels for guiding outward movement of said roof extension panels, a side wall portion operatively conected to each of said roof extension panels, each of said side wall portions including an upper panel and a lower panel having adjacent horizontal edges, means pivotally connecting said adjacent horizontal edges together, the upper panel of each side wall portion being pivotally connected to the outer portion of the adjacent roof extension panel, the pivotal connections between said upper panels and the said adjacent extension panels and between the upper panels and the lower panels of said side wall portions all being disposed to turn on substantially parallel axes, an end wall portion at each of the end portions of said roof main part, means extending along and pivotally connecting the upper edge portion of each end wall portion with the adjacent facade plate of said roof main part, each of said end wall portions having a pair of spaced substantially parallel side edges, an end wall extension panel pivotally connected with each of the opposite side edges of each end wall portion, a support means secured to and extending across an upper portion of each end wall extension panel, means on the opposite ends of each of said roof exetnsion panels for engaging said support means to support the roof extension panels in the outermost positions relative to said roof main part, at least one of said end wall portions having a door opening therein and a pivotally mounted door means thereon controlling said opening for gaining access to the inetrior of the erected enclosure, said side wall portions and the end wall extension panels being relatively pivotable from a position wherein they are disposed in folded relationship and extend substantially parallel with said roof main part to an erected position wheerin they are disposed uprightly substantially normal to said roof main part.

References Cited by the Examiner

UNITED STATES PATENTS

| | | | |
|---|---|---|---|
| 1,796,112 | 3/1931 | McArthur | 296—23 |
| 2,167,557 | 7/1939 | Stout | 296—23 |
| 2,245,465 | 6/1941 | Cole | 52—32 |
| 2,323,106 | 6/1943 | Whiteman | 52—66 |
| 2,395,691 | 2/1946 | Smith | 52—69 |
| 2,533,683 | 12/1950 | Neuhaus | 52—29 |
| 2,706,132 | 4/1955 | Chaffin | 52—66 |
| 2,765,499 | 10/1956 | Couse | 52—66 |
| 2,856,645 | 10/1958 | Herrmeyer | 52—32 |
| 2,890,907 | 6/1959 | Briskie et al. | 52—68 |
| 2,965,412 | 12/1960 | Henderson et al. | 52—67 |
| 3,018,857 | 1/1962 | Parham | 52—63 |
| 3,050,331 | 8/1962 | Mansen | 52—71 |
| 3,097,400 | 7/1963 | Davis | 52—70 |

FOREIGN PATENTS

| | | |
|---|---|---|
| 217,811 | 1/1957 | Australia. |
| 634,112 | 1/1962 | Canada. |

FRANK L. ABBOTT, *Primary Examiner.*

EARL J. WITMER, *Examiner.*

R. A. STENZEL, *Assistant Examiner.*